US012639893B2

(12) United States Patent
Tamstorf et al.

(10) Patent No.: US 12,639,893 B2
(45) Date of Patent: May 26, 2026

(54) ACCELERATED SUM-OF-SQUARES COLLISION DETECTION FOR TIME-VARYING CURVED SHAPES

(71) Applicant: DISNEY ENTERPRISES, INC., Burbank, CA (US)

(72) Inventors: Rasmus Tamstorf, Los Angeles, CA (US); Zoe Sarah Marschner, Ithaca, NY (US); Paul Zhang, Medford, MA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 496 days.

(21) Appl. No.: 18/351,405

(22) Filed: Jul. 12, 2023

(65) Prior Publication Data

US 2025/0022229 A1 Jan. 16, 2025

(51) Int. Cl.
*G06T 19/00* (2011.01)
*G06F 111/10* (2020.01)

(52) U.S. Cl.
CPC .......... *G06T 19/00* (2013.01); *G06F 2111/10* (2020.01); *G06T 2210/21* (2013.01)

(58) Field of Classification Search
None
See application file for complete search history.

(56) References Cited

U.S. PATENT DOCUMENTS

| | | | | |
|---|---|---|---|---|
| 10,497,163 | B1 * | 12/2019 | Sachania | G06T 13/40 |
| 2014/0321736 | A1 * | 10/2014 | Onai | G06T 13/80 |
| | | | | 382/154 |
| 2021/0188309 | A1 * | 6/2021 | Zhu | G01C 21/38 |
| 2024/0042698 | A1 * | 2/2024 | Lappas | G06T 19/20 |

OTHER PUBLICATIONS

Ahmadi et al., "Geometry of 3D Environments and Sum of Squares Polynomials", Dept. of Operations Research and Financial Engineering, arXiv:1611.07369, Mar. 7, 2017, 10 pages.
Alizadeh, Farid, "Interior Point Methods in Semidefinite Programming with Applications to Combinatorial Optimization", http://www.siam.org/journals/ojsa.php, vol. 5, No. 1, Feb. 1995, pp. 13-51.
Amice et al., "Finding and Optimizing Certified, Collision-Free Regions in Configuration Space for Robot Manipulators", 2022, pp. 1-16.
Bergou et al., "Discrete Viscous Threads", ACM Transactions on Graphics, http://doi.acm.org/10.1145/1778765.1778853, vol. 29, No. 4, Article 116, Jul. 2010, pp. 116:1-116:10.
(Continued)

*Primary Examiner* — Saptarshi Mazumder
(74) *Attorney, Agent, or Firm* — Squire Patton Boggs LLP; Sarah Mirza

(57) ABSTRACT

A method for detecting collisions associated with a simulation includes generating a plurality of spline-based representations associated with a plurality of objects. The method also includes determining a semialgebraic domain associated with the plurality of spline-based representations and performing an optimization over the semialgebraic domain to determine one or more collision states associated with the plurality of objects. The method further includes causing the simulation to be performed based on the one or more collision states.

20 Claims, 6 Drawing Sheets

Start

Generate spline-based representations of objects in a simulation
502

Determine a semialgebraic domain associated with the spline-based representations
504

Perform an optimization over the semialgebraic domain to determine one or more collision states associated with the objects
506

Cause a simulation to be performed based on the collision state(s)
508

End

(56) References Cited

OTHER PUBLICATIONS

Burley et al., "The Design and Evolution of Disney's Hyperion Renderer", ACM Transactions on Graphics, https://doi.org/10.1145/3182159, vol. 37, No. 3, Article 33, Jul. 2018, pp. 33:1-33:22.

Daniilidis, Konstantinos, "Hand-Eye Calibration Using Dual Quaternions", The International Journal of Robotics Research, vol. 18, No. 3, Mar. 1999, pp. 286-298.

Lorenzis et al., "Isogeometric Contact: A Review", GAMM-Mitt., DOI 10.1002/gamm.201410005, vol. 37, No. 1, Jul. 7, 2014, pp. 85-123.

Ferguson et al., "High-Order Incremental Potential Contact for Elastodynamic Simulation on Curved Meshes", arXiv:2205.13727, May 27, 2022, pp. 1-9.

Ferguson et al., "Intersection-free Rigid Body Dynamics", ACM Transactions on Graphics, https://doi.org/10.1145/3450626.3459802, vol. 40, No. 4, Article 183, Aug. 2021, pp. 183:1-183:16.

Hughes et al., "Isogeometric Analysis: CAD, Finite Elements, NURBS, Exact Geometry and Mesh Refinement", doi:10.1016/j.cma.2004.10.008, vol. 194, 2005, pp. 4135-4195.

Jia, Yan-Bin, "Dual Quaternions", Retrieved from https://faculty.sites.iastate.edu/jia/files/inline-files/dual-quaternion.pdf, 2013, pp. 1-15.

Kavan et al., "Dual Quaternions for Rigid Transformation Blending", 2006, 10 pages.

Kavan et al., "Geometric Skinning with Approximate Dual Quaternion Blending", ACM Transactions on Graphics, http://doi.acm.org/10.1145/1409625.1409627, vol. 27, No. 4, Article 105, Oct. 2008, pp. 105:1-105:23.

Kulla et al., "Sony Pictures Imageworks Arnold", ACM Transactions on Graphics, https://doi.org/10.1145/3180495, vol. 37, No. 3, Article 29, Jul. 2018, pp. 29:1-29:18.

Laurent, Monique, "Semidefinite Representations for Finite Varieties", Math. Program., DOI 10.1007/s10107-004-0561-4, 2007, pp. 1-26.

Li et al., "Incremental Potential Contact: Intersection- and Inversion-free, Large-Deformation Dynamics", ACM Transactions on Graphics, https://doi.org/10.1145/3386569.3392425, vol. 39, No. 4, Article 49, Jul. 2020, pp. 49:1-49:20.

Lofberg, Johan, "YALMIP: A Toolbox for Modeling and Optimization in MATLAB", IEEE International Symposium on Computer Aided Control Systems Design, Sep. 24, 2004, pp. 284-289.

Lu et al., "Dynamic Cloth Simulation by Isogeometric Analysis", Comput. Methods Appl. Mech. Engrg., http://dx.doi.org/10.1016/j.cma.2013.09.016, vol. 268, 2014, pp. 475-493.

Marschner et al., "Hexahedral Mesh Repair via Sum-of-Squares Relaxation", Eurographics Symposium on Geometry Processing, DOI:10.1111/cgf.14074, vol. 39, No. 5, 2020, pp. 133-147.

Marschner et al., "Sum-of-Squares Geometry Processing", ACM Transactions on Graphics, arXiv:2110.08451, vol. 40, No. 6, Article 253, Dec. 2021, pp. 253:1-253:13.

MOSEK ApS, "MOSEK Optimization Toolbox for MATLAB", Release 8.1.0.83, 2020, 335 pages.

Nakamaru et al., "Ray Tracing for Curves Primitive", Journal of WSCG, vol. 10, 2002, 6 pages.

Nie, Jiawang, "Optimality Conditions and Finite Convergence of Lasserre's Hierarchy", DOI 10.1007/s10107-013-0680, May 17, 2013, 25 pages.

Parrilo, Pablo A., "Structured Semidefinite Programs and Semialgebraic Geometry Methods in Robustness and Optimization", May 18, 2000, pp. 1-135.

Paul, George Vikram, "Kinematics of Objects in Contact using Dual Vectors and its Applications", Nov. 1997, 126 pages.

Redon et al., "An Algebraic Solution to the Problem of Collision Detection for Rigid Polyhedral Objects", Proceedings of the 2000 IEEE International Conference on Robotics, Automation, Apr. 2000, pp. 3733-3738.

Schneider et al., A Large-Scale Comparison of Tetrahedral and Hexahedral Elements for Solving Elliptic PDEs with the Finite Element Method, arXiv:1903.09332, ACM Transactions on Graphics, vol. 1, No. 1, Article 1, Jan. 2022, pp. 1:1-1:14.

Snyder, John M., "Interval Analysis for Computer Graphics", Computer Graphics, vol. 26, No. 2, Jul. 1992, pp. 121-130.

Snyder et al., "Interval Methods for Multi-Point Collisions between Time-Dependent Curved Surfaces", In Proceedings of the 20th Annual Conference on Computer Graphics and Interactive Techniques (SIGGRAPH '93), 1993, pp. 321-334.

Stengle, Gilbert, "Complexity Estimates for the Schmudgen Positivstellensatz", Journal Of Complexity, vol. 12, 1996, pp. 167-174.

Thyng et al., "The Art and Technology of Hair Simulation in Disney's Moana", DOI: http://dx.doi.org/10.1145/3084363.3085072, Jul. 30-Aug. 3, 2017, 2 pages.

Trusty et al., "The Shape Matching Element Method: Direct Animation of Curved Surface Models", ACM Transactions on Graphics, vol. 40, No. 4, Article 69, Aug. 2021, pp. 69:1-69:14.

Wampler et al., "Numerical Algebraic Geometry and Algebraic Kinematics", Acta Numerica, DOI: 10.1017/S0962492911000067, vol. 20, May 2011, pp. 469-567.

Wang et al., "A Large-scale Benchmark and an Inclusion-based Algorithm for Continuous Collision Detection", ACM Transactions on Graphics, https://doi.org/10.1145/3460775, vol. 40, No. 5, Article 188, Sep. 2021, pp. 188:1-188:16.

Yang et al., "An Inexact Projected Gradient Method with Rounding and Lifting by Nonlinear Programming for Solving Rank-One Semidefinite Relaxation of Polynomial Optimization", arXiv:2105.14033, Oct. 26, 2021, pp. 1-42.

Yu et al., "Repulsive Surfaces", ACM Transactions on Graphics, https://doi.org/10.1145/3478513.3480521, vol. 40, No. 6, Article 268, Dec. 2021, pp. 268:1-268:19.

* cited by examiner

Start

Generate spline-based representations of objects in a simulation
502

Determine a semialgebraic domain associated with the spline-based representations
504

Perform an optimization over the semialgebraic domain to determine one or more collision states associated with the objects
506

Cause a simulation to be performed based on the collision state(s)
508

End

ACCELERATED SUM-OF-SQUARES COLLISION DETECTION FOR TIME-VARYING CURVED SHAPES

BACKGROUND

Field of the Various Embodiments

Embodiments of the present disclosure relate generally to graphics and simulations and, more specifically, to accelerated sum-of-squares collision detection for time-varying curved shapes.

DESCRIPTION OF THE RELATED ART

Sum-of-Squares Programming (SOSP) refers to a mathematical optimization technique that can be used to solve problems with polynomial objective functions. SOSP involves relaxing a polynomial optimization problem to an optimization that is constrained to a set of polynomials that can be written as a sum of squares of polynomial functions.

SOSP can, in concept, be used in various types of simulations and/or models. For example, robotic and/or vehicular paths, optical cables, hair strands, hair bundles, and/or other types of curved geometries or trajectories could be modeled using splines that are represented using polynomials. These polynomials could then be used with SOSP to detect collisions, intersections, and/or other events related to the curved geometries.

However, existing SOSP techniques tend to be too slow and computationally complex to be used with problems involving curved geometries and/or other more complex representations. More specifically, the size and runtime of a typical SOSP optimization scales factorially with the degree of the polynomials in the corresponding SOSP problem. Consequently, a conventional SOSP formulation that represents objects and/or trajectories using cubic and/or quadratic splines with degrees higher than 2 can be too complex to be tractable.

As the foregoing illustrates, what is needed in the art are more effective techniques for solving SOSP problems involving representations of curved object geometries and/or paths.

SUMMARY

One embodiment of the present invention sets forth a technique for detecting collisions associated with a simulation. The technique includes generating a plurality of tapered cubic cylinder representations associated with a plurality of objects. The technique also includes determining a semialgebraic domain associated with the plurality of tapered cubic cylinder representations and performing an optimization over the semialgebraic domain to determine one or more collision states associated with the plurality of objects. The technique further includes causing the simulation to be performed based on the one or more collision states.

One technical advantage of the disclosed techniques relative to the prior art is the ability to generate polynomial representations of certain time-varying curved shapes and/or trajectories in simulations, which allows continuous collision detection (CCD) problems involving these shapes and/or trajectories to be solved using SOSP formulations. Another technical advantage of the disclosed techniques is the use of various speedups to improve the computational complexity and/or runtime of the SOSP formulations. In this regard, the disclosed techniques can significantly increase the speed with which lower degree CCD problems are solved and can additionally be used to generate tractable SOSP formulations of higher degree CCD problems. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
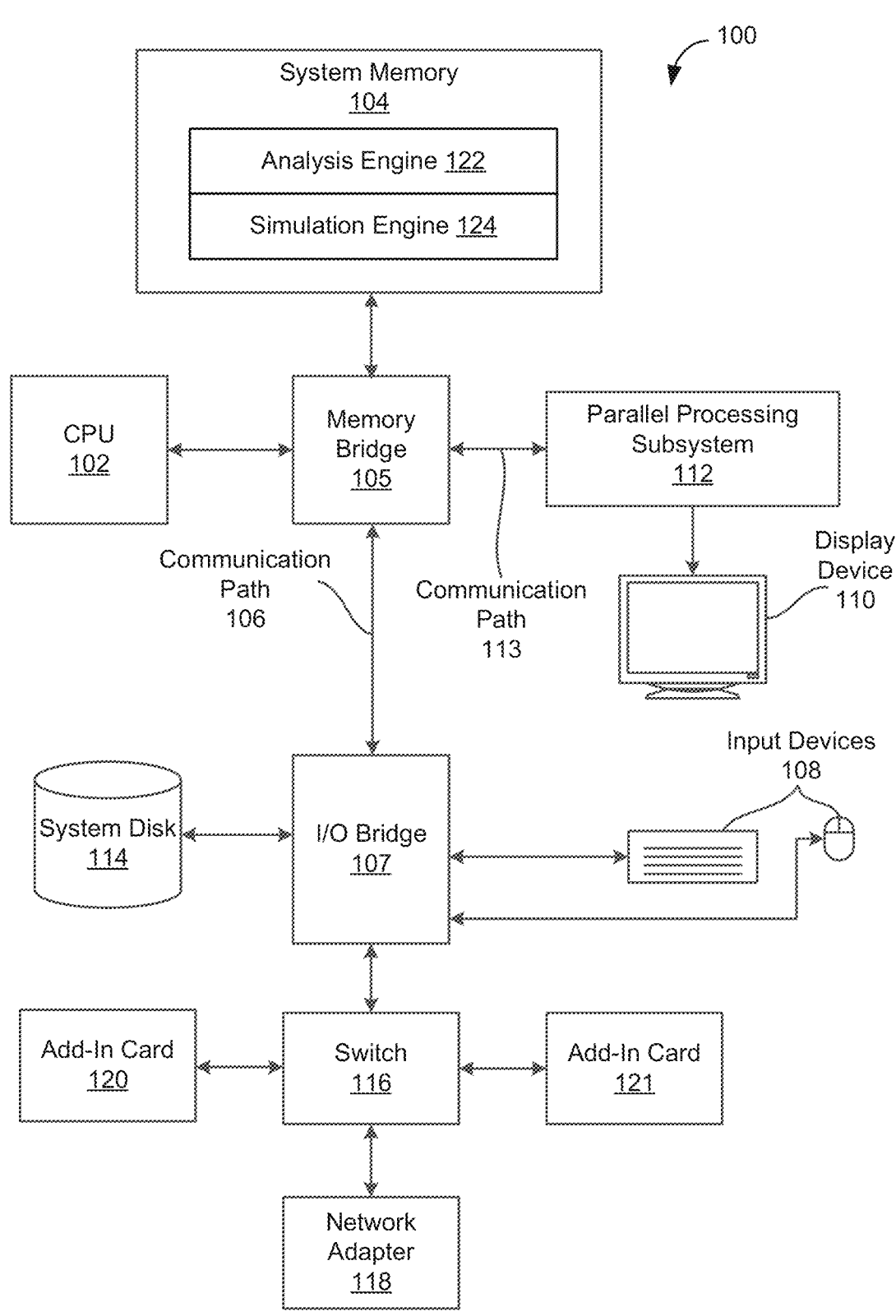
FIG. 1 is a block diagram illustrating a computer system configured to implement one or more aspects of various embodiments.

FIG. 1 is a block diagram illustrating a computer system 100 configured to implement one or more aspects of various embodiments. In one embodiment, computer system 100 includes a desktop computer, a laptop computer, a smart phone, a personal digital assistant (PDA), tablet computer, or any other type of computing device configured to receive input, process data, and optionally display images, and is suitable for practicing one or more embodiments. Computer system 100 also, or instead, includes a machine or processing node operating in a data center, cluster, or cloud computing environment that provides scalable computing resources (optionally as a service) over a network.

As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

I/O bridge 107 is configured to receive user input information from optional input devices 108, such as a keyboard, a microphone, or a mouse, and forward the input information to CPU 102 for processing via communication path 106 and memory bridge 105. In some embodiments, computer system 100 may be a server machine in a cloud computing environment. In such embodiments, computer system 100 may not have input devices 108. Instead, computer system 100 may receive equivalent input information by receiving commands in the form of messages transmitted over a network and received via the network adapter 118. In one embodiment, switch 116 is configured to provide connections between I/O bridge 107 and other components of the computer system 100, such as a network adapter 118 and various add-in cards 120 and 121.

In one embodiment, I/O bridge 107 is coupled to a system disk 114 that may be configured to store content and applications and data for use by CPU 102 and parallel processing subsystem 112. In one embodiment, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 includes a graphics subsystem that delivers pixels to an optional display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs), also referred to herein as parallel processors, included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver configured to manage the processing operations of the one or more PPUs within parallel processing subsystem 112.

Parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

In one embodiment, CPU 102 is the master processor of computer system 100, controlling and coordinating operations of other system components. In one embodiment, CPU 102 issues commands that control the operation of PPUs. In some embodiments, communication path 113 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality of the system can be distributed across multiple nodes of a distributed and/or cloud computing system. Second, the connection topology, including the number and arrangement of bridges, the number of CPUs 102, and the number of parallel processing subsystems 112, can be modified as desired. For example, in some embodiments, system memory 104 could be connected to CPU 102 directly rather than through memory bridge 105, and other devices would communicate with system memory 104 via memory bridge 105 and CPU 102. In another example, parallel processing subsystem 112 may be connected to I/O bridge 107 or directly to CPU 102, rather than to memory bridge 105. In a third example, I/O bridge 107 and memory bridge 105 may be integrated into a single chip instead of existing as one or more discrete devices. Third one or more components shown in FIG. 1 may not be present. For example, switch 116 could be eliminated, and network adapter 118 and add-in cards 120, 121 would connect directly to I/O bridge 107.

In one or more embodiments, computer system 100 is configured to execute an analysis engine 122 and a simulation engine 124 that reside in system memory 104. Analysis engine 122 and simulation engine 124 may be stored in system disk 114 and/or other storage and loaded into system memory 104 when executed.

More specifically, analysis engine 122 includes functionality to detect collisions involving objects associated with curved shapes and/or curved paths. For example, analysis engine 122 could determine the times and/or locations of collisions involving objects that move along curved trajectories and are represented using linear triangle meshes, bicubic quad meshes, cubic spline wireframes, quartic triangle meshes, trilinear hexahedral meshes, and/or other types of geometric elements. Analysis engine 122 could also, or instead, detect the times and/or locations of collisions between strands of hair and/or other objects with time-varying curved shapes by representing these objects using tapered cubic cylinders that include cubic spline centerlines with linearly varying radiuses. As discussed in further detail below, analysis engine 122 uses an accelerated Sum-of-Squares Programming (SOSP) technique with polynomial representations of the curved shapes and/or curved trajectories to detect collisions involving the curved shapes and/or curved trajectories in a computationally efficient manner.

Simulation engine 124 includes functionality to perform various types of simulations involving collisions detected by analysis engine 122. For example, simulation engine 124 could perform dynamic, rigid body, and/or other types of simulations that include collisions between curved shapes and/or objects with curved trajectories. Analysis engine 122 and simulation engine 124 are described in further detail below.

Accelerated Sum-of-Squares Collision Detection for Curved Shapes and Paths

Figure 2:
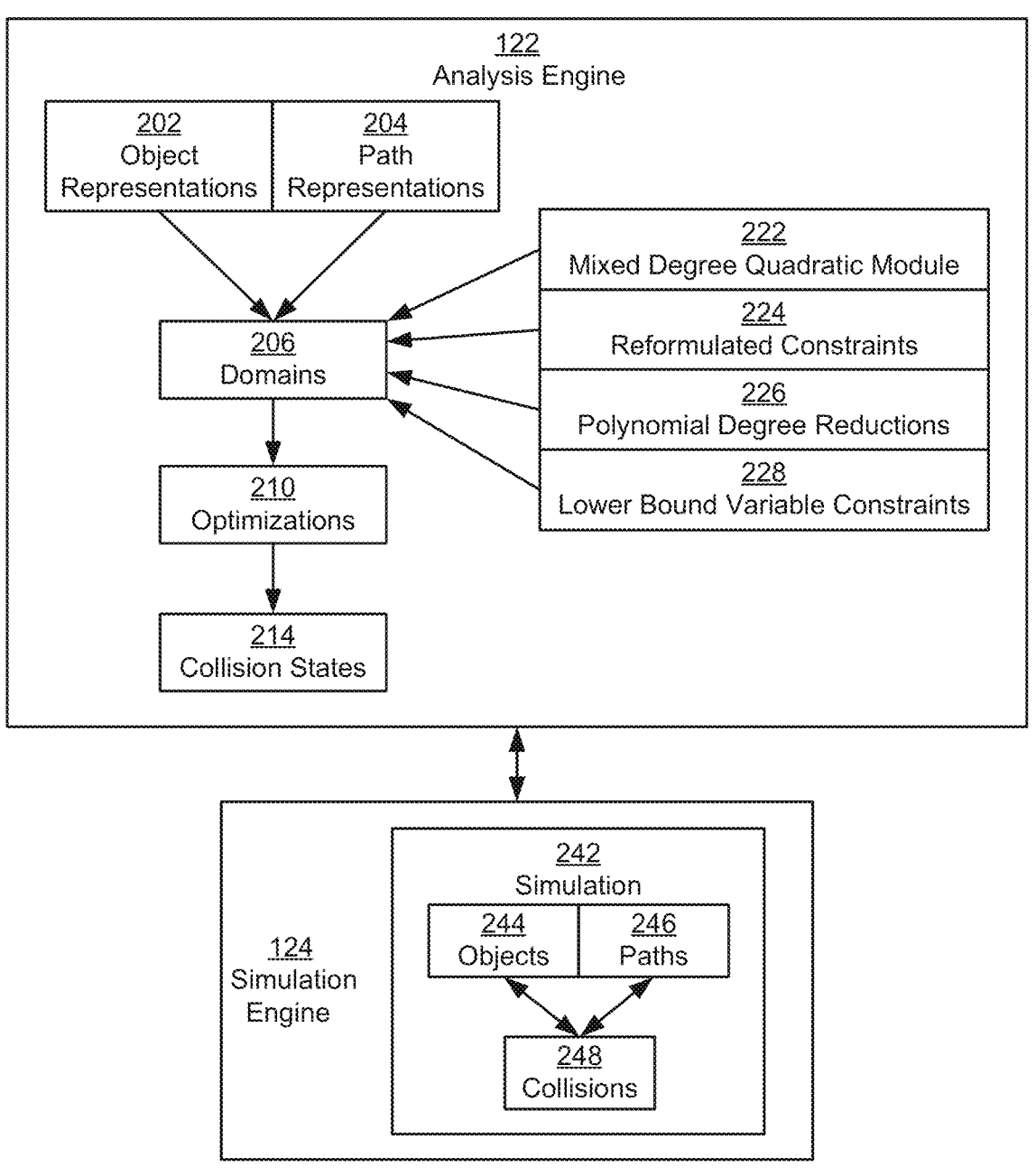
FIG. 2 is a more detailed illustration of the analysis engine and simulation engine of FIG. 1, according to various embodiments.

FIG. 2 is a more detailed illustration of analysis engine 122 and simulation 124 engine of FIG. 1, according to various embodiments. As mentioned above, analysis engine 122 and simulation engine 124 operate to perform a simulation 242 that involves collisions 248 associated with objects 244 and/or paths 246 traversed by objects 244.

As shown in FIG. 2, analysis engine 122 generates object representations 202 of objects 244 in simulation 242. Analysis engine 122 also, or instead, generates path representations 204 of paths 246 traversed by objects 244 within simulation 242. Analysis engine 122 generates one or more domains 206 associated with object representations 204 and/or path representations 204. Analysis engine 122 further performs one or more optimizations 210 over domains 206 to detect collision states 214 related to collisions 248 within simulation 242, given the shapes of objects 244 and/or paths 246 traversed by objects 244. In some embodiments, collision states 214 include times, locations, and/or other attributes of collisions 248 between objects 244 in simulation 242.

As mentioned above, analysis engine 122 can use an SOSP technique to determine collision states 214 associated with collisions 248. The SOSP technique optimizes over a semialgebraic domain (e.g., domains 206) that includes a set of polynomial equalities and/or inequalities that take non-negative values. For example, let $\mathbb{R}[u]=\mathbb{R}[u_1, \ldots, u_k]_d$ be a ring of polynomials in u of maximum degree d, and let $\Sigma_d$ be the set of Sum-of-Squares (SOS) polynomials of maximum degree d:

$$\Sigma_d = \left\{ \Sigma_i p_i^2 : p_i \in \mathbb{R}[u]_{\left\lfloor \frac{d}{2} \right\rfloor} \right\}.$$

In this example notation, omitting d implies unrestricted degree.

Continuing with the above example, let $\mathcal{G} \subset \mathbb{R}[u]$, $\mathcal{H} \subset \mathbb{R}[u]$ define a compact semialgebraic domain (e.g., in domains 206):

$$\mathbb{D} = \{ u \in \mathbb{R}^k : \forall g \in \mathcal{G}, h \in \mathcal{H}, g(u) \geq 0, h(u) = 0 \} \tag{1}$$

In some embodiments, $\mathcal{G}$ and $\mathcal{H}$ represent inequality constraints and equality constraints, respectively, within the semialgebraic domain. Given a polynomial objective f(u), a generic polynomial optimization can include the following representation:

$$f^* = f(u^*) = \min f(u) : u \in \mathbb{D} \tag{2}$$

Equation 2 can equivalently be expressed with a polynomial positivity constraint $f^*=\max\{\gamma : u \in \mathbb{D} \Rightarrow f(u)-\gamma \geq 0\}$. While such constraints can be NP-hard to maintain, an easier constraint is $f(u)-\gamma \in Q(\mathcal{G},\mathcal{H})$, where:

$$Q(\mathcal{G},\mathcal{H})_d = \left\{ s_0 + \sum_{g} s_g g + \sum_{h} p_h h : s_0 \in \Sigma, s_g \in \Sigma_d, p_h \in \mathbb{R}[u]_d \right\} \tag{3}$$

is the d-truncated quadratic module. In the above equation, $s_g$ and $p_h$ represent multiplier polynomials, while g and h define $\mathbb{D}$. Membership in the d-truncated quadratic module is assured with semidefinite matrix constraints, thereby convexifying Equation 2 into the following semidefinite program (SDP):

$$f_d^* = \max\{\gamma \in \mathbb{R} : f(u) - \gamma \in Q(\mathcal{G},\mathcal{H})_d\} \tag{4}$$

By construction, elements of $Q(\mathcal{G},\mathcal{H})$ are non-negative on $\mathbb{D}$.

According to Putinar's Positivstellensatz, when $\mathbb{D}$ is a domain with an algebraic certificate of compactness, any polynomial f(u) that is strictly positive on $\mathbb{D}$ is an element of $Q(\mathcal{G},\mathcal{H})$. Thus, $$f_d^* \leq f^*, \text{ and } f_d^* \to f^* \text{ as } d \to \infty.$$

Further, if $$f_d^* = f^*$$

and the dual SDP matrix has rank 1, the unique u* can be read off the first column of the SDP matrix. This can be detected by verifying $\lambda_2=0$, where $\lambda_2$ is the second largest eigenvalue of the dual SDP matrix, and is known as exact recovery. In some instances, the first column of the dual SDP matrix can include u* even without exact recovery.

The SOSP framework can be used to formulate geometric kernel problems that include continuous collision detection (CCD) problems and surface-surface intersection (SSI) problems. The CCD problem attempts to find the earliest time of collision involving an object (e.g., objects 244) along a given path (e.g., paths 246). The SSI problem attempts to find an intersection of two objects.

For example, let $$x(u, v, t) = \sum_i^{n_B} (p_i + v_i t) \phi_i(u, v)$$

denote the embedding of a Bézier triangle with control points $p_i$, velocities $v_i$, and $n_B$ basis functions $\phi_i$ of degree $d_\phi$. In accordance with Equation 1, the domain is specified by sets of polynomials $\mathcal{G}, \mathcal{H}$. Let $\mathcal{G}_1=\{u_1, v_1, 1-u_1-v_1\}$ and $\mathcal{G}_2=\{u_2, v_2, 1-u_2-v_2\}$ be polynomials specifying two flat triangular domains, and let $\mathcal{G}_t=\{t, 1-t\}$ be polynomials specifying a time interval of interest. The CCD domain is given by u=$\{u_1, v_1, u_2, v_2, t\}$ satisfying inequalities $\mathcal{G} = \mathcal{G}_1 \cup \mathcal{G}_2 \cup \mathcal{G}_t$, and three equalities $\mathcal{H} =\{x_1(u_1, v_1, 0)_{xyz}-x_2(u_2, v_2, 0)_{xyz}\}$ with the objective polynomial f(u)=t. The SSI domain is the set u=$\{u_1, v_1, u_2, v_2\}$ satisfying inequalities $\mathcal{G} = \mathcal{G}_1 \cup \mathcal{G}_2$ and three equalities $\mathcal{H} =\{x_1(u_1, v_1, 0)_{xyz}-x_2(u_2, v_2, 0)_{xyz}\}$ with objective polynomial f(u)=$x_1(u_1, v_1, 0)_x$. For the CCD problem to be reliably solved, multiplier polynomials are typically degree 5 for a quadratic Bézier triangle and degree 6 for a cubic Bézier triangle.

In some embodiments, analysis engine 122 extends the CCD problem to curved paths 246 through the Lie group SE(3) of rigid body motions. Within SE(3), rigid body motions that include rotations and translations are represented using unit dual quaternions $\mathbb{D} \mathbb{H}_1$.

As described herein, a quaternion formulates a four-dimensional manifold as a generalization of complex numbers. A quaternion can be written in the form $q=q_0+q$, where $q_0$ is a scalar and $q=q_1i+q_2j+q_3k$ is a vector. Within the quaternion, $q_0$, $q_1$, $q_2$, and $q_3$ are real numbers and i, j, and k are the imaginary quaternion units. Quaternion multiplication can be defined as $q \otimes p=q_0p_0-q \cdot p+q_0p+p_0q+q \times p$, where $q \cdot p$ denotes the dot product and $q \times p$ denotes the cross product. The overall space of quaternions can be denoted as $\mathbb{H}$ and includes a subspace of unit quaternions that is defined as $\mathbb{H}_1:=\{q:q \in \mathbb{H}, \|q\|=1\}$, where $\|q\|$ denotes the quaternion norm. The space of quaternions also includes a subspace of pure quaternions that is defined as $\mathbb{H}_0:=\{q:q \in \mathbb{H}, q_0=0\}$.

The space of unit quaternions can represent three-dimensional (3D) rotations. For example, a rotation defined by an axis a and an angle $\theta$ can be represented by a quaternion as $q=\cos(\theta)+\sin(\theta)\alpha$. A point $p=(p_x,p_y,p_z)$ can be rotated by this quaternion through the multiplication $0+p'=q \lfloor (0+p) \rfloor q^*$, where * denotes the quaternion conjugate.

A dual quaternion $Q=p+\epsilon q \in \mathbb{D}\mathbb{H}$ in an eight-dimensional space is constructed by combining quaternions p and q with the dual unit $\epsilon$, where $\epsilon^2=0$ but $\epsilon \neq 0$. The dual quaternion is associated with the conjugation operation $Q^\dagger=p^*+\epsilon q^*$. Dual quaternion multiplication can be generalized from multiplication of dual numbers as $Q_1 \lfloor Q_2=(p_1+\epsilon q_1) \lfloor (p_2+\epsilon q_2)=p_1 \lfloor p_2+\epsilon(p_1 \lfloor q_2+p_2 \lfloor q_1)$.

Using the above, the space of unit dual quaternions can be defined as a six-dimensional subspace of $\mathbb{D}\mathbb{H}$:

$$\mathbb{D}\mathbb{H}_1 = \{Q \in \mathbb{D}\mathbb{H}: Q^\dagger \otimes Q = 1\} = \{p + \epsilon q \in \mathbb{D}\mathbb{H}: p \cdot q = 0, \|p\| = 1\} \quad (5)$$

A dual quaternion within this subspace can represent a rigid transformation in 3D.

For example, a rigid transformation could be represented by the dual quaternion $$Q = r + c\frac{1}{2}tr, \quad (40)$$

where r is a rotation quaternion and a pure quaternion $t=0+t$ represents a translation along a vector $t=\{t_x, t_y, t_z\}$. This dual quaternion could be combined with a point v encoded as a dual quaternion $Q_v=1+\epsilon v$ to compute the transformed point $Q_v'$ after applying rigid transform $Q$:

$$Q_{v'} = Q \otimes Q_v \otimes Q^\dagger = Q \otimes (1 + \epsilon v) \otimes Q^\dagger = 1 + \epsilon(rvr^* + t) \quad (6)$$

The above expression is polynomial in the coordinates of v. Because many operations involving dual quaternions result in low-degree polynomials, dual quaternion representations are well suited to SOSP problems.

Interpolation on the manifold associated with $\mathbb{D}\mathbb{H}_1$ can be performed to construct a path between two rigid transforms. For example, a dual quaternion linear interpolation (DQLERP) technique can be used to project a linear interpolation (LERP) onto $\mathbb{D}\mathbb{H}_1$ via normalization:

$$DQLERP(Q_0, Q_1, t) := \frac{Q_0 + t(Q_1 - Q_0)}{\|Q_0 + t(Q_1 - Q_0)\|} \quad (7)$$

A more canonical interpolation can be performed using screw motions, which represent all rigid motions (as stated in Chasles' theorem). A screw motion includes a rotation around a screw axis and a translation along the same axis and can be represented by a number of screw parameters: two vectors (l, m) with $\|l\|=1$ and $l \cdot m=0$, the Plücker coordinates of the screw axis, the rotation angle $\theta$, and the translation distance $\delta$. These screw parameters parameterize the Lie algebra se(3), which is the tangent space to SE(3). The exponential map exp: se(3)→SE(3) using a screw parameter representation of se(3) and a $\mathbb{D}\mathbb{H}_1$ representation of SE(3) includes the following:

$$\exp: (l, m, \theta, \delta) \mapsto \left(c + sl + \epsilon\left(-\frac{\delta s}{2} + \frac{\delta c}{2}l + sm\right)\right) \quad (8)$$

$$c := \cos\left(\frac{\theta}{2}\right), s := \sin\left(\frac{\theta}{2}\right) \quad (9)$$

Using the standard $\log=\exp^{-1}$ map and $Q^*=p^*-\epsilon q^*$, the screw space linear interpolation (ScLERP) includes the following:

$$(l, m, \theta, \delta) := \log(Q_0^* Q_1) \quad (10)$$

$$ScLERP(Q_0, Q_1, t) := Q_0 \exp(l, m, t\theta, t\delta) \quad (11)$$

From Equation 11, angular and translational velocity are constant along the path. ScLERP additionally traces a geodesic from $Q_0$ to $Q_1$ in SE(3).

An alternative map between the Lie algebra $\mathbb{D}\mathbb{H}_0 \cong se(3)$ and the Lie group $\mathbb{D}\mathbb{H}_1 \cong SE(3)$ includes a Cayley map, which is defined as Cay:

$$\mathbb{D}\mathbb{H}_0 \to \mathbb{D}\mathbb{H}_1 q \mapsto \frac{1+q}{1-q}$$

and includes an accompanying inverse map that is defined as $Cay^{-1}$:

$$\mathbb{D}\mathbb{H}_1 \to \mathbb{D}\mathbb{H}_0 Q \mapsto \frac{Q-1}{Q+1}.$$

While the Cayley map maps to the same space as the exponential map of Equation 8, the representation of this space is different, in that the mapping to se(3) via the Cayley map does not lead to the linearity of the angle and displacement seen in ScLERP.

The Cayley map can additionally be used to define another interpolation method in the Lie algebra as ScLERP$_{Cay}$ $$(Q_0, Q_1, t) := Q_0 Cay(t Cay^{-1}(Q_0^\dagger Q_1)).$$

Because the Cayley map is rational, ScLERP$_{Cay}$ provides a rational formulation for interpolation between two dual quaternion rigid transformations using the Lie algebra and can therefore be used in an SOSP problem.

In one or more embodiments, analysis engine 122 applies a number of speedups to domains 206 to improve the speed and/or efficiency with which optimizations 210 are performed. As shown in FIG. 2, these speedups include (but are not limited to) a mixed degree quadratic module 222, one or more reformulated constraints 224, one or more polynomial degree reductions 226, and/or one or more lower bound variable constraints 228.

As mentioned above, the runtime of an SOSP problem depends significantly on the number of monomials in the parameters of the d-truncated quadratic module (i.e., monomials of $s_0$, $s_g$, and $p_h$ in Equation 3). More specifically, the number of monomials in the parameters of the d-truncated quadratic module grows factorially with degree d. Equivalently, d controls the expressiveness of the d-truncated quadratic module, which should be expressive enough for exact recovery.

To more finely control the expressiveness of the d-truncated quadratic module of Equation 3, mixed degree quadratic module 222 includes a separation of the truncation of inequality and equality multipliers:

$$Q(\mathcal{G},\mathcal{H})_{d_1,d_2} = \left\{s_0 + \sum_g s_g g + \sum_h p_h h : s_0 \in \Sigma, s_g \in \Sigma_{d_1}, p_h \in \mathbb{R}[u]_{d_2}\right\} \quad (12)$$

Since h in CCD problems encodes intersection and frequently has much higher degree than g, when $d_1 = d_2$, the runtime of a CCD problem is much more sensitive to $d_2$. Discarding redundant monomials from $p_h$ can additionally allow for exact recovery.

Note that the quadratic module in Equations 3 and 12 is not directly dependent on domain $\mathbb{D}$ but is instead constructed from $\mathcal{G}, \mathcal{H}$ used to describe $\mathbb{D}$. Additionally, different ways of writing the same domain (i.e., reformulated constraints 224 in the domain) can have a significant effect on the functions the quadratic module is able to express, and no choice of $\mathcal{G}$, $\mathcal{H}$ is necessarily canonical. Further, pairs of elements of $\mathcal{G}$ can be replaced with the corresponding product to produce an alternate description of the domain from which the quadratic module can be built.

In some embodiments, extrapolating to more than pairwise products of $\mathcal{G}$ leads to a variant Positivstellensatz. Let $\mathcal{H} = 0$ and $\mathcal{G}_n = \{g_1 g_2 \ldots g_n : g_i \in \mathcal{G}\}$ be the set of n-way products of elements of $\mathcal{G}$. Let $\hat{\mathcal{G}} = \cup_i \mathcal{G}_i$ be the union of $\mathcal{G}_n$. According to Schmüdgen's Positivstellensatz, if $\mathbb{D} = \{u \in \mathbb{R}^k : \forall g \in \mathcal{G}, g(u) \geq 0\}$ is a compact domain, any polynomial $f(u)$ that is strictly positive on $\mathbb{D}$ is an element of $\mathcal{G}(\hat{\mathcal{G}}, 0)$. Because $Q(\hat{\mathcal{G}}, 0)$ is increased in size relative to $Q(\mathcal{Q}, 0)$, Schmüdgen's Positivstellensatz has fewer assumptions than Putinar's Positivstellensatz. At the same time, $\hat{\mathcal{G}}$ can be significantly larger than $\mathcal{G}$ from a computational perspective, which leads to more multiplier polynomials in the quadratic module and a larger final SDP. To counteract this increase in size, a subset of $\hat{\mathcal{G}}$ that still encodes $\mathbb{D}$ can be selected in a way that solves Equation 2. This selection procedure effectively increases the degree of polynomials in $\mathcal{G}$ while decreasing $|\mathcal{G}|$.

Polynomial degree reductions 226 involve reducing the degree of polynomials in $\mathcal{G}$ by increasing the number of variables and constraints. An example of polynomial degree reductions 226 includes the following:

$$\mathbb{D}_0 = \{x : x^6 \geq 0\}, \mathbb{D}_1 = \{(x, y) : y^2 \geq 0 \text{ and } x - y^3 = 0\} \quad (13)$$

In the above example, projecting $\mathbb{D}_1$ onto its first dimension produces $\mathbb{D}_0$. However, by introducing the new variable y, the maximum degree of the defining polynomial is reduced to 3. This type of decrease can have a large impact on the maximum degree of an SOS problem involving $\mathbb{D}_0$, and can be used to balance the number of polynomials and the degree of the polynomials in the SOS problem.

Lower bound variable constraints 228 involve constraining the lower bound variable $\gamma$ from Equation 4:

$$t_d^* = \max\left\{\gamma \in [0, 1] : t - \gamma \in Q(\mathcal{G}, \mathcal{H})_d\right\} \quad (14)$$

Lower bound variable constraints 228 apply when a minimum and maximum time, such as 0 and 1, are known (e.g., in a CCD problem). The $\gamma \in [0,1]$ constraint is separate from the $t \in [0,1]$ constraint that is encoded in $\mathcal{G}$.

In one or more embodiments, collision states 214 determined by analysis engine 122 in solving a CCD problem can include an intersecting pair certificate and/or an earliest collision certificate. Analysis engine 122 determines that collision states 214 include an intersecting pair when a pair of object geometries already intersects at time t=0. If the pair of object geometries does not already intersect at t=0, analysis engine 122 can determine that collision states 214 include an earliest collision representing the earliest time at which the pair of geometries collides.

A certificate of collision is a point $u = \{u_1, v_1, u_2, v_2, t\}$ satisfying inequalities $\forall g \in \mathcal{G}$, $g(u) \geq 0$ such that $$x_1(u_1, v_1, t) = x_2(u_2, v_2, t) \quad (15)$$

Earliest collision is certified by u* of the CCD problem in conjunction with exact recovery, where $\lambda_2 = 0$. More specifically, u* satisfies Equation 15 and certifies collision, and $\lambda_2 = 0$ is used to establish that the collision is the earliest.

When the configuration given to a CCD problem already intersects at t=0, two surfaces will generically intersect at more than one location, which interferes with exact recovery. To resolve this, intersecting pair can be certified by u satisfying Equation 15 with t=0. This can be obtained by solving the SSI problem, which includes an objective polynomial that is not time and therefore can produce a unique solution.

In some embodiments, analysis engine 122 uses finite precision to solve CCD problems. Consequently, certain equations can be verified only within a certain tolerance. With these tolerances, the effective algebraic certificates include:

$$\lambda_2 = \epsilon_\lambda, \gamma \geq \epsilon_\gamma, D(u) \leq \epsilon_x \quad (17)$$

In one or more embodiments, analysis engine 122 uses tapered cubic cylinders (TCCs) as object representations 202 of curved objects 244 with geometries that vary with time. A TCC includes a cubic spline centerline with a radius varying linearly from $l_0$ to $l_1$ and can include the following representation:

$$\mathbb{T} = \{c(\xi, t) + [x, y, z]^T : x^2 + y^2 + z^2 = \tag{18}$$

$$((1 - \xi)l_0 + \xi l_1)^2 \text{ and } \xi, t \in [0, 1]\}$$

where $c(\xi, t)$ is a time-varying cubic curve that is cubic in $\xi$ and linear in t. The TCC additionally includes spherical endcaps.

As discussed above, rigid paths 246 for objects 244 can be constructed by interpolating dual quaternions. For SOSP to be applicable, these interpolations should be algebraic. DQLERP applied to a point combines Equations 6 and 7 into a rational expression. Because ScLERP includes trigonometric functions in Equation 9, an algebraic representation of ScLERP, such as ScLERP$_{Cay}$, can be used in lieu of ScLERP.

An additional factor to choosing path representations 204 of paths 246 is the corresponding polynomial degree. Applying an interpolated quaternion to a point results in a rational polynomial:

$$Q_{vt} := \frac{N_{vt}}{D_{vt}} := Q_t \otimes Q_v \otimes Q_t^\dagger \tag{19}$$

where $N_{vt}$ is a polynomial dual quaternion, $D_{vt}$ is a polynomial scalar, and $Q_t:[0,1] \to \mathbb{DH}_1$ is a curve of unit dual quaternions parameterized by time t. The degree of the path is the degree of t in Equation 19. $N_{vt}$ and $D_{vt}$ each have a degree of 2 for both ScLERP$_{Cay}$ and DQLERP interpolations on $\mathbb{DH}_1$.

Using the above, analysis engine 122 can use SOSP to formulate the CCD problem for two objects 244 with polynomial geometry object representations 202 that follow paths 246 with interpolated dual quaternion representations 204. Analysis engine 122 can also, or instead, generate an SOSP formulation of a related problem of colliding a curved object with a stationary plane. In general, the SOSP formulation can be applied to any geometry expressible as an algebraic map P(u) over a base domain (e.g., domains 206).

In some embodiments, the domain of the SOSP formulation includes inequality constraints for the time interval and geometric object, as described above with respect to Bézier triangle representations. Applying Equation 19 with $Q_v = 1 + \epsilon P(u)$ gives a polynomial representation of every point on a given object as the object undergoes rigid motion. This polynomial representation can then be used to construct collision constraints.

For CCD between a rigidly moving object and a stationary plane defined by normal n and offset a, the equality constraint includes the following representation:

$$n \cdot \text{dual}\{N_{vt}\} - aD_{vt} = 0 \tag{20}$$

In the above equation, dual$\{\cdot\}$ extracts the vector part of the dual portion of a dual quaternion (e.g., the coordinates in $\mathbb{R}^3$ of a point represented by a point dual quaternion).

The CCD problem between two rigidly moving objects 244 denoted by A and B includes three collision equality constraints defined by equating points in the two objects 244:

$$\text{dual}\{N_{vt,A}\}D_{vt,B} - \text{dual}\{N_{vt,B}\}D_{vt,A} = 0 \tag{21}$$

To reduce the complexity of the above CCD problem, bounding ellipsoids for these objects 244 can be used as a culling step.

More specifically, ellipsoids can be defined by a rotation encoded as a dual quaternion $Q_e$ and a set of axis lengths $\mathcal{L} \in \mathbb{R}^3$. The CCD problem for two ellipsoid objects 244 moving along dual quaternion paths 246 has a separate SOSP formulation. This formulation includes variables $\{t, x_A, x_B\}$, with $x_A, x_B \in \mathbb{R}^3$. Additionally, $\mathcal{G} = \{t, 1-t, 1-\|x_A\|^2, 1-\|x_B\|^2\}$ specifies the time interval and two balls. Equation 19 can be applied to ellipsoid A to obtain $Q_{vA} = 1 + \epsilon(x_A \odot \mathcal{L}_A)$ using the elementwise product $\odot$ and $Q_{tA} = \text{interp}(Q_0, Q_1, t)$, where interp is a $\mathbb{DH}_1$ interpolation. The same process can be repeated for ellipsoid B, and the collision equality constraint can be provided by Equation 21.

As discussed above, analysis engine 122 can use mixed degree quadratic module 222, reformulated constraints 224, polynomial degree reductions 226, and/or lower bound variable constraints 228 to improve the speed and/or efficiency of optimizations 210 used to determine collision states 214 associated with collisions 248 involving objects 244 on corresponding paths 246. In the case of Bézier curves denoted by $$c_1(\xi, t) = \sum_i^{n_B} (p_i + t v_i) \phi_i(\xi) \text{ and } c_2(\zeta, t) = \sum_i^{n_B} (q_i + t w_i) \phi_i(\zeta)$$

with basis functions $\phi_i$ of degree $d_\phi = \{1,2,3\}$, the basic CCD problem is specified with polynomial sets $\mathcal{G}_a = \{\xi, 1-\xi, \zeta, 1-\zeta, t, 1-t\}$, $\mathcal{H} = \{c_1(\xi,t) - c_2(\zeta,t)\}$ and includes the following representation:

$$\max_{\gamma \in \mathbb{R}} \gamma : f - \gamma \in Q(\mathcal{G}_a, \mathcal{H})_d \quad (CCD_d^{1D})$$

Using mixed degree quadratic module 222, reformulated constraints 224, and lower bound variable constraints 228 results in an alternative formulation specified with polynomials $\mathcal{G}_b = \{\xi(1-xi), \zeta(1-\zeta), t(1-t)\}$:

$$\max_{\gamma \in [0,1]} \gamma : f - \gamma \in Q(\mathcal{G}_b, \mathcal{H})_{d_1, d_2} \quad (CCD_{d_1, d_2}^{1D})$$

While the full Schmudgen's Positivstellensatz is inapplicable (because $\mathcal{G}_b = \hat{\mathcal{G}}_a$), this formulation has been found to be very effective.

More specifically, a batch test included 1000 configurations of $\{p_i, q_i, v_i, w_i\}$ that were randomly generated according to a standard normal distribution. Additionally, a directional vector d of length $\frac{1}{3}$ was uniformly sampled, and $p_i$, $w_i$ and $q_i$, $v_i$ were translated by d and $-d$, respectively. This shifting step roughly encourages collisions between splines $c_1$ and $c_2$ on the d axis. The results of the batch test indicates average speedups of 1.4×, 10×, and 5.3× for degrees $d_\phi$ of 1, 2, and 3, respectively. Additionally, culling strategies were used to certify intersecting pair and/or other conditions prior to trying to certify earliest collision with CCD, thereby allowing CCD to be skipped in some instances. With these culling strategies, average speedups of 0.62×, 4.8×, and 26× were measured for degrees $d_\phi$ of 1, 2, and 3, respectively.

Using the same notation as the previous CCD formulation of Bézier triangles described above and referring to the previous CCD formulation as $$CCD_d^{2D},$$

analysis engine 122 can generate the following two modified CCD formulations for Bézier triangles:

$$\max_{\gamma\in[0,1]}\gamma:t-\gamma\in Q(G_1\cup G_2\cup t(1-t),\mathcal{H})_{d_1,d_2} \quad (CCD_{d_1,d_2}^{2Da})$$

$$\max_{\gamma\in[0,1]}\gamma:t-\gamma\in Q(G_1\cup G_2\cup G_t,\mathcal{H})_{d_1,d_2} \quad (CCD_{d_1,d_2}^{2Db})$$

The intersecting pair formulation for Bézier triangles includes the following:

$$\max_{\gamma\in\mathbb{R}}\gamma:x_1(u_1,v_1,0)-\gamma\in Q(G_1\cup G_2,\mathcal{H})_{d_1,d_2} \quad (IP_{d_1,d_2}^{2D})$$

Because the intersecting pair objective has asymmetric dependence on $x_1$, if the first application of the intersecting pair problem fails to return a certificate, the same intersecting pair problem can be applied with swapped parameters $p_i\leftrightarrow q_i$, $v_i\leftrightarrow w_i$.

To test the modified CCD and intersecting pair formulations for Bézier triangles, 1000 configurations of $\{p_i, q_i, v_i, w_i\}$ were randomly generated according to a standard normal distribution. Additionally, a directional vector d of length $\frac{1}{3}$, $\frac{1}{2}$, and $\frac{1}{1,625}$ was uniformly sampled for degrees $d_\phi$ of 1, 2, and 3, respectively, to roughly balance the number of intersecting pair and CCD cases, and $p_i$, $w_i$ and $q_i$, $v_i$ were translated by d and $-$d, respectively. The results of the batch test indicates average speedups of 3.9×, 25×, and 21× for degrees $d_\phi$ of 1, 2, and 3, respectively. Additionally, culling strategies were used to certify intersecting pair and/or other conditions prior to trying to certify earliest collision with CCD, thereby allowing CCD to be skipped in some instances. With these culling strategies, average speedups of 38×, 53×, and 338× were measured for degrees $d_\phi$ of 1, 2, and 3, respectively.

As mentioned above, objects 244 with curved geometries that vary over time can be represented using TCCs. Given these TCC object representations 202, analysis engine 122 can generate an efficient SOSP formulation of the CCD problem between two objects 244 represented by time-varying TCCs.

Figure 3:
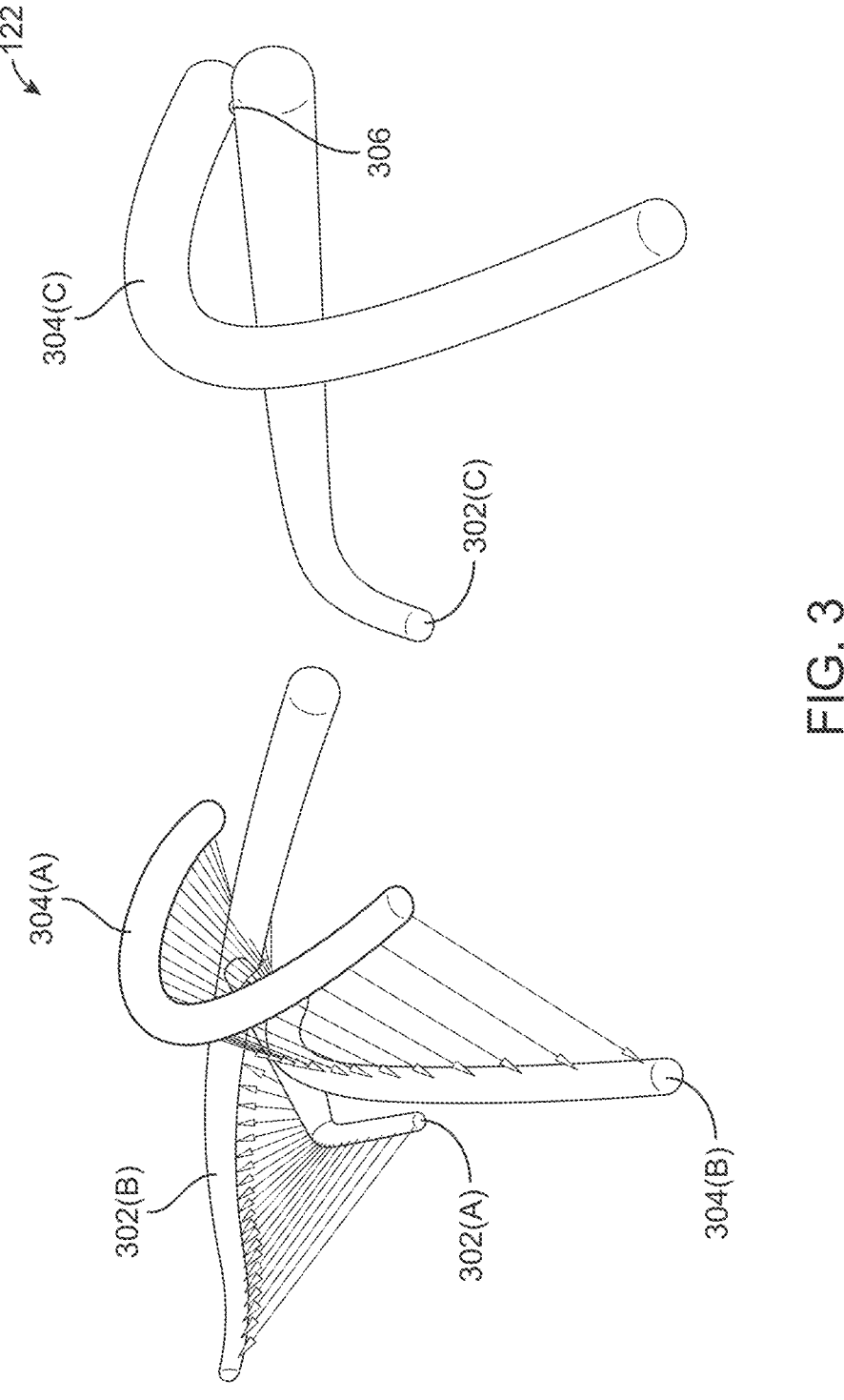
FIG. 3 illustrates how the analysis engine of FIG. 1 performs collision detection between two example objects with tapered cubic cylinder (TCC) geometries, according to various embodiments.

FIG. 3 illustrates how analysis engine 122 of FIG. 1 performs collision detection between two example objects with TCC geometries, according to various embodiments. As shown in FIG. 3, a first object includes a first geometry 302(A) at a first time t=0 and a second geometry 302(B) at a second time t=1, and a second object includes a first geometry 304(A) at the first time and a second geometry 304(B) at the second time. Each object linearly transitions between the first geometry and the second geometry over a period of time between t=0 and t=1, as denoted by arrows between the first geometry and second geometry.

Given the first geometries 302(A), 304(A) and second geometries 302(B), 304(B) of the two objects, analysis engine 122 can solve a CCD problem that includes these geometries to identify a third geometry 302(C) of the first object and 304(C) of the second object that lies along the transition between the first and second geometries and represents the earliest collision between the two objects. The third geometries 302(C) and 304(C) for the objects are additionally associated with a point 306 representing the location of the earliest collision between the two objects.

Returning to the discussion of FIG. 2, the notation described above with respect to Bezier curves can be used to specify two time-varying TCCs, with $\{p_i, q_i, v_i, w_i\}$ indicating parameters of the time-dependent cubic splines $c_1(\xi, t)$ and $c_2(\zeta, t)$. The first TCC has radii interpolating linearly from $l_0$ to $l_1$ with respect to $\xi$, and the second TCC has radii interpolating linearly from $m_0$ to $m_1$ with respect to $\zeta$. Let $G_{b1}=\{\xi, 1-\xi,\zeta,1-\zeta\}$, $G_{b2}=\{\xi(1-\xi), \zeta(1-\zeta)\}$, $G_c=\{t(1-t)\}$ be the inequality sets constraining $(\xi,\zeta,t)\in[0,1]^3$. From Equation 18, $$\mathcal{H}_1 = \{x_1^2 + y_1^2 + z_1^2 - ((1-\xi)l_0 + \xi l_1)^2, x_2^2 + y_2^2 + z_2^2 - ((1-\zeta)m_0 + \zeta m_1)^2\}$$

represents equality constraints that parameterize two spheres of linearly varying radius, and $\mathcal{H}_2=\{c_1(\xi, t)+[x_1, y_1, z_1]^T - c_2(\zeta, t)-[x_2, y_2, z_2]^T\}$ represents intersection constraints. Combining these polynomials produces the following CCD problem:

$$\max_{\gamma\in[0,1]}\gamma:t-\gamma\in Q(G_{b2}\cup G_c,\mathcal{H}_1\cup\mathcal{H}_2)_{d_1,d_2} \quad (CCD_{d_1,d_2}^{TCC})$$

The intersecting pair formulation for two time-varying TCCs includes the following:

$$\max_{\gamma\in\mathbb{R}}\gamma:u^T\vec{r}-\gamma\in Q(G_{b2}\cup G_c,\mathcal{H}_1\cup\mathcal{H}_2)_{d_1,d_2} \quad (IP_{d_1,d_2}^{TCC})$$

where $u=[\xi, \zeta, x_1, y_1, z_1, x_2, y_2, z_2]^T$ is a vector of all variables in the problem (e.g., coordinates and/or parameters associated with the TCCs) and $\vec{r}$ is a random vector. By introducing $x_1, y_1, z_1, x_2, y_2, z_2$, the objective drops from degree 8 to 1.

1000 random CD tests were also performed using the TCC formulation above, with spline centerlines generated using 1000 configurations of $\{p_i, q_i, v_i, w_i\}$ that were randomly generated according to a standard normal distribution. Radii l and m were sampled uniformly in the range [0, 0.2]+0.01. Average runtimes of the intersecting pair problem were 103-104 ms, and average runtimes of $$CCD_{2,2}^{TCC}, CCD_{2,3}^{TCC}, \text{ and } CCD_{4,2}^{TCC}$$

were 408 ms, 6290 ms, and 83,500 ms, respectively.

To improve the speed and efficiency of the CCD problem on objects 244 with polynomial geometry object representations 202 that follow paths 246 with dual quaternion path representations 204, analysis engine 122 uses reformulated constraints 224 that replace pairs of linear domain constraints in $G$ with corresponding quadratic constraints. For example, in the case of bicubic Bézier patches, analysis engine 122 could use a domain $G=\{t(t-1), u(1-u), v(1-v)\}$, where u, v denote coordinates in the unit-square pre-image of a bicubic Bézier patch.

In another example, when a triangular domain of Bézier triangle elements is used, analysis engine 122 could use the domain $\mathcal{G}=\{t(t-1), u, v, 1-u-v\}$. Analysis engine 122 could also use mixed degree quadratic module 222 to achieve exact recovery on colliding examples tested with degree [$d_1$, $d_2$]=[2,1] for linear triangle problems and [$d_1$, $d_2$]=[6,2] for bicubic quad mesh, cubic spline wireframe, quartic Bézier triangle mesh, and trilinear hexahedral mesh problems.

For the CCD problem between objects 244 represented by rigidly moving bicubic patches, DQLERP interpolation can be used to lower the degree of the largest polynomial by 4, which results in a corresponding reduction in running time. Computationally expensive patch-patch CCD problems can also be culled by first computing CCD between bounding ellipsoids for patches in objects 244 and subsequently computing CCD for patches associated with collisions in the corresponding bounding ellipsoids. This culling approach can speed up the overall computation time by 12.7× compared with computing patch-patch CCD for all bicubic patches in objects 244. For the ellipsoid-ellipsoid CCD problem, analysis engine 122 can combine t and 1−t constraints into a quadratic constraint. Analysis engine 122 can also, or instead, apply polynomial degree reductions 226 by introducing new variables $y_A$ and $y_B$, which are constrained to equal the denominators of the interpolated point dual quaternions through equality constraints of $\{y_A-D_{v_t,A}=0,$ $y_B-D_{v_t,B}=0\}$. These polynomial degree reductions 226 reduce the degree from [2,3] to [2,2] and decrease the overall problem size, leading to a total speedup of almost 4× when reformulated constraints 224, polynomial degree reductions 226, and lower bound variable constraints 228 are all applied and smaller speedups of when one or two of reformulated constraints 224, polynomial degree reductions 226, and lower bound variable constraints 228 are applied.

Figure 4:
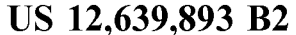
FIG. 4 illustrates how the analysis engine of FIG. 1 performs collision detection between two example objects with bicubic Bézier geometries on curved trajectories, according to various embodiments.

FIG. 4 illustrates how analysis engine 122 of FIG. 1 performs collision detection between two example objects with bicubic Bézier geometries on curved trajectories, according to various embodiments. As shown in FIG. 4, both objects include bicubic patch representations of teapots. The first object is swept along a first DQLERP trajectory 402, and the second object is swept along a second DQLERP trajectory 404. These trajectories 402 and 404 cause the two objects to experience an earliest collision 406 at a time at which trajectories 402 and 404 intersect.

FIG. 4 also illustrates bounding ellipsoids 408 and 410 for different bicubic patches within each object. Collisions between these bounding ellipsoids 408 and 410 are detected during a culling step, with the bounding ellipsoids for which collisions are detected shown in lighter shades.

Finally, FIG. 4 illustrates patches 412 and 414 for which collisions were detected in the corresponding bounding ellipsoids. Each patch in a given object is shaded based on the time of the earliest collision with any patch in the other object. These times of collision range from t=0.45 to t=0.575.

Returning to the discussion of FIG. 2, simulation engine 124 uses collision states 214 determined by analysis engine 122 to perform simulation 242 that includes collisions 248 involving objects 244 on the corresponding paths 246. For example, simulation engine 124 could run simulation 242 over a series of time steps in which objects 244 move along the corresponding paths 246. When one or more collisions 248 involving objects 244 and/or paths 246 are detected by analysis engine 122, simulation engine 124 could generate new paths for the corresponding objects 244, generate deformations and/or changes to the shapes of objects 244, and/or otherwise update simulation 242 based on the detected collisions 248. Simulation engine 124 could also, or instead, use objects 244, paths 246, and/or collisions 248 to generate an animation, volumetric scene, two-dimensional (2D) model, 3D model, engineering model, biological model, and/or other output related to objects 244, paths 246, collisions 248, and/or other elements of simulation 242.

Figure 5:
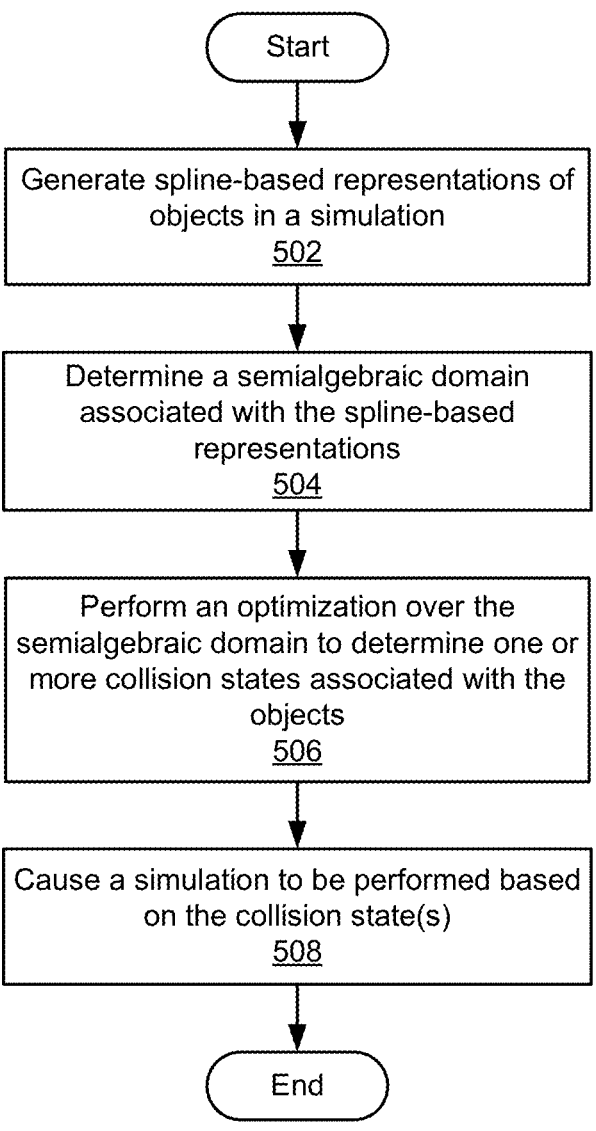
FIG. 5 sets forth a flow diagram of method steps for detecting collisions within a simulation that includes curved shapes, according to various embodiments.

FIG. 5 sets forth a flow diagram of method steps for detecting collisions within a simulation that includes curved shapes, according to various embodiments. Although the method steps are described in conjunction with the systems of FIGS. 1-2, persons skilled in the art will understand that any system configured to perform the method steps in any order falls within the scope of the present disclosure.

As shown, in step 502, analysis engine 122 generates spline-based representations of objects in the simulation. For example, analysis engine 122 could represent one or more curved objects in the simulation as one or more corresponding time-varying TCCs, where each TCC includes a sphere of varying radius that is swept along a cubic spline centerline. Analysis engine 122 could also, or instead, represent one or more curved objects in the simulation as Bézier curves, Bézier triangles, Bézier surfaces, and/or other types of mathematical splines.

In step 504, analysis engine 122 determines a semialgebraic domain associated with the spline-based representations. For example, analysis engine 122 could determine inequality constraints associated with a time interval spanned by the simulation and the spline-based representations and/or equality constraints representing intersections associated with the plurality of objects. Analysis engine 122 could also, or instead, generate a quadratic module that separates the truncation of a set of inequality multipliers associated with the domain from the truncation of a set of equality multipliers associated with the domain. This quadratic module could include a first degree associated with inequality constraints in the domain and a second degree associated with equality constraints in the domain. Analysis engine 122 could also, or instead, constrain a lower bound variable associated with a semidefinite program corresponding to the optimization over the semialgebraic domain to a range of 0 to 1. Analysis engine 122 could also, or instead, combine a pair of linear domain constraints associated with a variable into a quadratic constraint.

In step 506, analysis engine 122 performs an optimization over the semialgebraic domain to determine one or more collision states associated with the objects. For example, analysis engine 122 could determine a minimum and/or maximum value associated with the domain that represents the earliest time at which two objects collide. Analysis engine 122 could also, or instead, perform an optimization to determine whether two objects are touching or intersecting at the beginning of the simulation.

In step 508, analysis engine 122 and/or simulation engine 124 cause the simulation to be performed based on the collision state(s). For example, analysis engine 122 could provide times, locations, and/or other attributes of the earliest collisions and/or intersections between a given pair of objects to simulation engine 124. Simulation engine 124 could use collision states detected by analysis engine 122 to generate new paths for the corresponding objects, generate deformations and/or changes to the shapes of the objects, and/or otherwise update the simulation based on the detected collision states. Simulation engine 124 could also, or instead, generate an animation, volumetric scene, 2D and/or 3D model, engineering model, biological model, and/or other output depicting the objects, paths, collisions, and/or other elements of the simulation.

Figure 6:
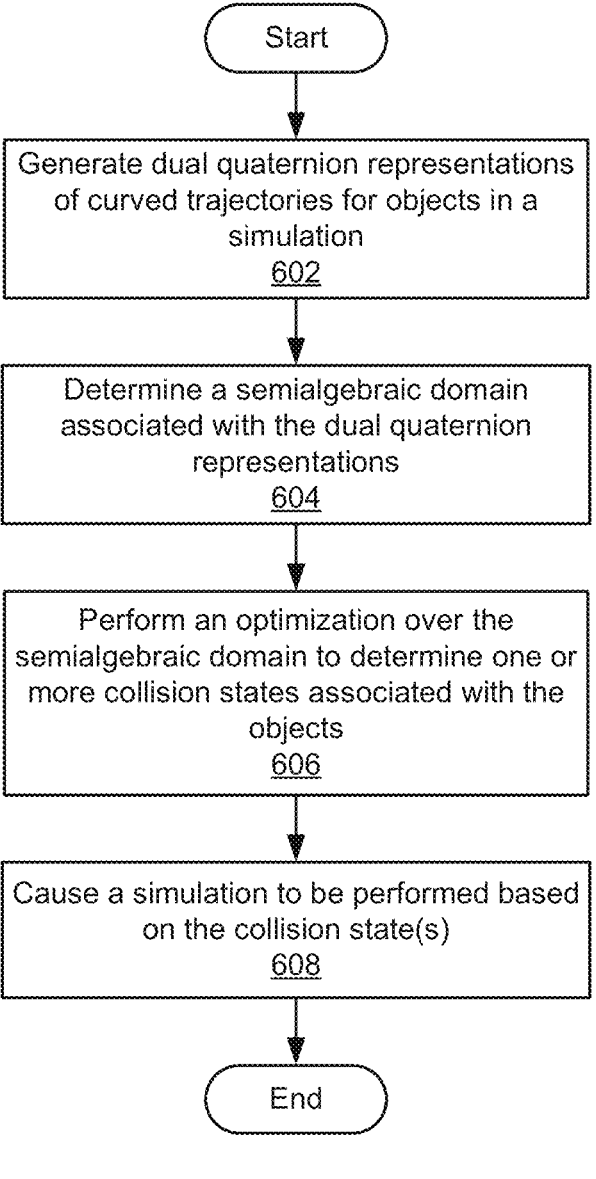
FIG. 6 sets forth a flow diagram of method steps for detecting collisions within a simulation that includes objects with curved trajectories, according to various embodiments.

FIG. 6 sets forth a flow diagram of method steps for detecting collisions within a simulation that includes objects with curved trajectories, according to various embodiments. Although the method steps are described in conjunction with the systems of FIGS. 1-2, persons skilled in the art will understand that any system configured to perform the method steps in any order falls within the scope of the present disclosure.

As shown, in step 602, analysis engine 122 generates dual quaternion representations of objects in the simulation. For example, analysis engine 122 could represent a curved trajectory for a given object in the simulation as a linear interpolation between a first dual quaternion representing a first rigid transformation of the object and a second dual quaternion representing a second rigid transformation of the object. The linear interpolation could include a DQLERP, a Cayley map, and/or another polynomial representation of the path of the object.

In step 604, analysis engine 122 determines a semialgebraic domain associated with the dual quaternion representations. For example, analysis engine 122 could determine inequality constraints associated with a time interval spanned by the simulation and the objects and/or equality constraints representing intersections associated with the dual quaternion representations. Analysis engine 122 could also, or instead, generate a quadratic module that separates the truncation of inequality multipliers associated with the domain from the truncation of equality multipliers associated with the domain. This quadratic module could include a first degree associated with inequality constraints in the domain and a second degree associated with equality constraints in the domain. Analysis engine 122 could also, or instead, constrain a lower bound variable associated with a semidefinite program corresponding to the optimization over the semialgebraic domain to a range of 0 to 1. Analysis engine 122 could also, or instead, combine a pair of linear domain constraints associated with a variable into a quadratic constraint.

In step 606, analysis engine 122 performs an optimization over the semialgebraic domain to determine one or more collision states associated with the objects. For example, analysis engine 122 could initially perform CCD between bounding ellipsoids for patches within the objects and cull patches for which collisions involving the corresponding bounding ellipsoid were not detected. Analysis engine 122 could then perform CCD for the remaining unculled patches. During CCD, analysis engine 122 could determine a minimum and/or maximum value associated with the domain that represents the earliest time at which two objects collide. Analysis engine 122 could also, or instead, perform an optimization to determine whether two objects are touching or intersecting at the beginning of the simulation.

In step 608, analysis engine 122 and/or simulation engine 124 cause the simulation to be performed based on the collision state(s). For example, analysis engine 122 could provide times, locations, and/or other attributes of the earliest collisions and/or intersections between a given pair of objects to simulation engine 124. Simulation engine 124 could use collision states detected by analysis engine 122 to generate new paths for the corresponding objects, generate deformations and/or changes to the shapes of the objects, and/or otherwise update the simulation based on the detected collision states. Simulation engine 124 could also, or instead, generate an animation, volumetric scene, 2D and/or 3D model, engineering model, biological model, and/or other output depicting the objects, paths, collisions, and/or other elements of the simulation.

Analysis engine 122 and/or simulation engine 124 can additionally use the output of the simulation to perform various tasks. For example, analysis engine 122 and/or simulation engine 124 could incorporate a model, animation, and/or rendering that is generated based on the simulation and/or the collision states into an image, video, game, augmented reality (AR) environment, virtual reality (VR) environment, mixed reality (MR) environment, and/or another type of digital media and/or digital environment. In another example, analysis engine 122 and/or simulation engine 124 could use the output of the simulation to perform engineering, optimization, performance tuning, testing, training, education, and/or other operations related to a physical system that is modeled using the simulation. In a third example, analysis engine 122 and/or simulation engine 124 could use the output of the simulation to control the path and/or motion of an autonomous vehicle, robot, drone, and/or another type of machine so that the machine is able to avoid potential collisions with other objects in a physical or virtual environment. Analysis engine 122 and/or simulation engine 124 could also, or instead, use the output of the simulation to control the manner in which the machine pushes, pulls, grasps, touches, or otherwise interacts with another object in the physical or virtual environment.

In sum, the disclosed techniques include Sum-of-Squares Programming (SOSP) formulations of continuous collision detection (CCD) problems involving objects with curved shapes and/or paths. The SOSP formulations include polynomial representations of the curved shapes and/or paths, such as (but not limited to) tapered cubic cylinders composed of spheres of varying radius swept along cubic spline centerlines and/or linear interpolations of dual quaternions representing starting and ending rigid transformations of the objects. The SOSP formulations also include semialgebraic domains that specify inequality and equality constraints associated with the shapes and/or paths of the objects. The SOSP formulations additionally include polynomial optimizations over the semialgebraic domains to determine the earliest collisions involving the objects, intersections between objects at a start time (e.g., given the starting positions and/or orientations of the objects), and/or other collision states representing various types of collisions involving the objects. The collision states can then be used to conduct simulations that include the objects and corresponding paths.

The SOSP formulations include a number of speedups to improve the runtime of the CCD problems. One speedup includes a mixed degree quadratic module that separates the truncation of multipliers associated with inequality and equality constraints. Another speedup includes replacing a pair of linear domain constraints involving the same variable into one quadratic constraint. An additional speedup includes decreasing the degree of polynomials in the domain by increasing the number of variables and constraints. A further speedup includes constraining a lower bound variable in the optimization to a prespecified range (e.g., between 0 and 1).

One technical advantage of the disclosed techniques relative to the prior art is the ability to generate polynomial representations of certain time-varying curved shapes and/or trajectories in simulations, which allows CCD problems involving these shapes and/or trajectories to be solved using SOSP formulations. Another technical advantage of the disclosed techniques is the use of various speedups to improve the computational complexity and/or runtime of the SOSP formulations. In this regard, the disclosed techniques can significantly increase the speed with which lower degree CCD problems are solved and can additionally be used to generate tractable SOSP formulations of higher degree CCD problems. These technical advantages provide one or more technological improvements over prior art approaches.

1. In some embodiments, a computer-implemented method for detecting collisions associated with a simulation comprises generating a plurality of tapered cubic cylinder representations associated with a plurality of objects; determining a semialgebraic domain associated with the plurality of tapered cubic cylinder representations; performing an optimization over the semialgebraic domain to determine one or more collision states associated with the plurality of objects; and causing the simulation to be performed based on the one or more collision states.

2. The computer-implemented method of clause 1, wherein determining the semialgebraic domain comprises determining a first set of inequality constraints associated with a time interval spanned by the simulation and the plurality of tapered cubic cylinder representations.

3. The computer-implemented method of any of clauses 1-2, wherein determining the first set of inequality constraints comprises converting a second set of inequality constraints into the first set of inequality constraints, wherein the first set of inequality constraints has a greater number of variables and a greater number of constraints than the second set of inequality constraints.

4. The computer-implemented method of any of clauses 1-3, wherein determining the semialgebraic domain comprises determining a set of equality constraints representing intersections associated with the plurality of objects.

5. The computer-implemented method of any of clauses 1-4, wherein determining the semialgebraic domain comprises generating a quadratic module that separates a truncation of a set of inequality multipliers associated with the semialgebraic domain from a truncation of a set of equality multipliers associated with the semialgebraic domain.

6. The computer-implemented method of any of clauses 1-5, wherein performing the optimization over the semialgebraic domain comprises determining a point included in the semialgebraic domain that corresponds to an earliest collision between two objects included in the plurality of objects.

7. The computer-implemented method of any of clauses 1-6, wherein performing the optimization over the semialgebraic domain comprises determining an intersection between two objects included in the plurality of objects at a start time of the simulation based on a quadratic module that is built from a set of inequality constraints and a set of equality constraints associated with the plurality of tapered cubic cylinder representations.

8. The computer-implemented method of any of clauses 1-7, wherein each of the plurality of tapered cubic cylinder representations comprises a sphere of varying radius that is swept along a cubic spline centerline.

9. The computer-implemented method of any of clauses 1-8, wherein the plurality of tapered cubic cylinder representations comprises one or more time-varying cubic curves.

10. The computer-implemented method of any of clauses 1-9, wherein the plurality of objects comprises one or more strands.

11. In some embodiments, one or more non-transitory computer-readable media store instructions that, when executed by one or more processors, cause the one or more processors to perform the steps of generating a plurality of spline-based representations associated with a plurality of objects; determining a semialgebraic domain associated with the plurality of spline-based representations, wherein the semialgebraic domain comprises a quadratic module that includes a first degree associated with a first set of inequality constraints and a second degree associated with a first set of equality constraints; performing an optimization over the semialgebraic domain to determine one or more collision states associated with the plurality of objects; and causing a simulation to be performed based on the one or more collision states.

12. The one or more non-transitory computer-readable media of clause 11, wherein determining the semialgebraic domain comprises constraining a lower bound variable associated with a semidefinite program corresponding to the optimization over the semialgebraic domain to a range of 0 to 1.

13. The one or more non-transitory computer-readable media of any of clauses 11-12, wherein determining the semialgebraic domain comprises combining a pair of linear domain constraints associated with a variable into a quadratic constraint.

14. The one or more non-transitory computer-readable media of any of clauses 11-13, wherein determining the semialgebraic domain comprises converting a second set of inequality constraints into the first set of inequality constraints, wherein the first set of inequality constraints has a greater number of variables and a greater number of constraints than the second set of inequality constraints.

15. The one or more non-transitory computer-readable media of any of clauses 11-14, wherein performing the optimization over the semialgebraic domain comprises determining a value based on a set of constraints included the semialgebraic domain, a set of variables associated with the plurality of spline-based representations, and a set of random values.

16. The one or more non-transitory computer-readable media of any of clauses 11-15, wherein the set of variables comprises at least one of an x-coordinate, a y-coordinate, a z-coordinate, or a parameter that varies along a length of a spline-based representation.

17. The one or more non-transitory computer-readable media of any of clauses 11-16, wherein performing the optimization over the semialgebraic domain comprises determining a minimum value for a time that satisfies a set of constraints included in the semialgebraic domain.

18. The one or more non-transitory computer-readable media of any of clauses 11-17, wherein each of the plurality of spline-based representations comprises a sphere of varying radius that is swept along a time-varying cubic curve.

19. The one or more non-transitory computer-readable media of any of clauses 11-18, wherein the one or more collision states comprise at least one of an intersecting pair or an earliest collision.

20. In some embodiments, a system comprises one or more memories that store instructions, and one or more processors that are coupled to the one or more memories and, when executing the instructions, are configured to perform the steps of generating a plurality of spline-based representations associated with a plurality of objects; determining a semialgebraic domain associated with the plurality of spline-based representations, wherein determining the semialgebraic domain comprises replacing a plurality of elements included in the semialgebraic domain with a product of the plurality of elements; performing an optimization over the semialgebraic domain to determine one or more collision states associated with the plurality of objects; and causing a simulation to be performed based on the one or more collision states. In some embodiments, any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for detecting collisions associated with a simulation, the method comprising:
   generating a plurality of tapered cubic cylinder representations associated with a plurality of objects;
   determining a semialgebraic domain associated with the plurality of tapered cubic cylinder representations;
   performing an optimization over the semialgebraic domain to determine one or more collision states associated with the plurality of objects; and
   causing the simulation to be performed based on the one or more collision states.

2. The computer-implemented method of claim 1, wherein determining the semialgebraic domain comprises determining a first set of inequality constraints associated with a time interval spanned by the simulation and the plurality of tapered cubic cylinder representations.

3. The computer-implemented method of claim 2, wherein determining the first set of inequality constraints comprises converting a second set of inequality constraints into the first set of inequality constraints, wherein the first set of inequality constraints has a greater number of variables and a greater number of constraints than the second set of inequality constraints.

4. The computer-implemented method of claim 1, wherein determining the semialgebraic domain comprises determining a set of equality constraints representing intersections associated with the plurality of objects.

5. The computer-implemented method of claim 1, wherein determining the semialgebraic domain comprises generating a quadratic module that separates a truncation of a set of inequality multipliers associated with the semialgebraic domain from a truncation of a set of equality multipliers associated with the semialgebraic domain.

6. The computer-implemented method of claim 1, wherein performing the optimization over the semialgebraic domain comprises determining a point included in the semialgebraic domain that corresponds to an earliest collision between two objects included in the plurality of objects.

7. The computer-implemented method of claim 1, wherein performing the optimization over the semialgebraic domain comprises determining an intersection between two objects included in the plurality of objects at a start time of the simulation based on a quadratic module that is built from a set of inequality constraints and a set of equality constraints associated with the plurality of tapered cubic cylinder representations.

8. The computer-implemented method of claim 1, wherein each of the plurality of tapered cubic cylinder representations comprises a sphere of varying radius that is swept along a cubic spline centerline.

9. The computer-implemented method of claim 1, wherein the plurality of tapered cubic cylinder representations comprises one or more time-varying cubic curves.

10. The computer-implemented method of claim 1, wherein the plurality of objects comprises one or more strands.

11. One or more non-transitory computer-readable media storing instructions that, when executed by one or more processors, cause the one or more processors to perform the steps of:

generating a plurality of spline-based representations associated with a plurality of objects;

determining a semialgebraic domain associated with the plurality of spline-based representations, wherein the semialgebraic domain comprises a quadratic module that includes a first degree associated with a first set of inequality constraints and a second degree associated with a first set of equality constraints;

performing an optimization over the semialgebraic domain to determine one or more collision states associated with the plurality of objects; and causing a simulation to be performed based on the one or more collision states.

12. The one or more non-transitory computer-readable media of claim 11, wherein determining the semialgebraic domain comprises constraining a lower bound variable associated with a semidefinite program corresponding to the optimization over the semialgebraic domain to a range of 0 to 1.

13. The one or more non-transitory computer-readable media of claim 11, wherein determining the semialgebraic domain comprises combining a pair of linear domain constraints associated with a variable into a quadratic constraint.

14. The one or more non-transitory computer-readable media of claim 11, wherein determining the semialgebraic domain comprises converting a second set of inequality constraints into the first set of inequality constraints, wherein the first set of inequality constraints has a greater number of variables and a greater number of constraints than the second set of inequality constraints.

15. The one or more non-transitory computer-readable media of claim 11, wherein performing the optimization over the semialgebraic domain comprises determining a value based on a set of constraints included the semialgebraic domain, a set of variables associated with the plurality of spline-based representations, and a set of random values.

16. The one or more non-transitory computer-readable media of claim 15, wherein the set of variables comprises at least one of an x-coordinate, a y-coordinate, a z-coordinate, or a parameter that varies along a length of a spline-based representation.

17. The one or more non-transitory computer-readable media of claim 11, wherein performing the optimization over the semialgebraic domain comprises determining a minimum value for a time that satisfies a set of constraints included in the semialgebraic domain.

18. The one or more non-transitory computer-readable media of claim 11, wherein each of the plurality of spline-based representations comprises a sphere of varying radius that is swept along a time-varying cubic curve.

19. The one or more non-transitory computer-readable media of claim 11, wherein the one or more collision states comprise at least one of an intersecting pair or an earliest collision.

20. A system, comprising:

one or more memories that store instructions, and one or more processors that are coupled to the one or more memories and, when executing the instructions, are configured to perform the steps of:

generating a plurality of spline-based representations associated with a plurality of objects;

determining a semialgebraic domain associated with the plurality of spline-based representations, wherein determining the semialgebraic domain comprises replacing a plurality of elements included in the semialgebraic domain with a product of the plurality of elements;

performing an optimization over the semialgebraic domain to determine one or more collision states associated with the plurality of objects; and causing a simulation to be performed based on the one or more collision states.

\* \* \* \* \*